United States Patent [19]

Käser

[11] Patent Number: 5,203,876
[45] Date of Patent: Apr. 20, 1993

[54] PROCESS FOR DYEING PAPER

[75] Inventor: Adolf Käser, Bottmingen, Switzerland

[73] Assignee: Ciba-Geigy Corporation, Ardsley, N.Y.

[21] Appl. No.: 660,227

[22] Filed: Feb. 22, 1991

Related U.S. Application Data

[63] Continuation of Ser. No. 382,134, Jul. 19, 1989, abandoned.

[30] Foreign Application Priority Data

Jul. 22, 1988 [CH] Switzerland .......................... 2807/88

[51] Int. Cl.$^5$ .............................................. C09B 67/00
[52] U.S. Cl. ............................................. 8/527; 8/641; 8/648
[58] Field of Search .................... 8/527, 619, 641, 648

[56] References Cited

U.S. PATENT DOCUMENTS 4,118,182 10/1978 Smith ...................................... 8/527
4,314,816 2/1982 Tullio ...................................... 8/527

OTHER PUBLICATIONS

Dictionary of Organic Compounds, vol. 3, Jan. 1982, p. 3161.
Dictionary of Organic Compounds, vol. 1, Jan. 1982, p. 233.
W. Groebke et al., Chem. and Technical Progress in the Dyeing of Paper, Rev. Progress Coloration, vol. 14, pp. 132-138, Jul. 1984.
Chim. Ind. (Milan), 58(5), 320–322 (May 1976) corres. to Chem. Absts., 85: 95624y.
Tinctoria, 75(3), 73–80 (Mar. 1978), Corres. to Chem. Abstr., 90: 88723e.

Primary Examiner—A. Lionel Clingman
Assistant Examiner—William S. Parks
Attorney, Agent, or Firm—Marla Mathias; Edward McC. Roberts

[57] ABSTRACT

The dyes of formula

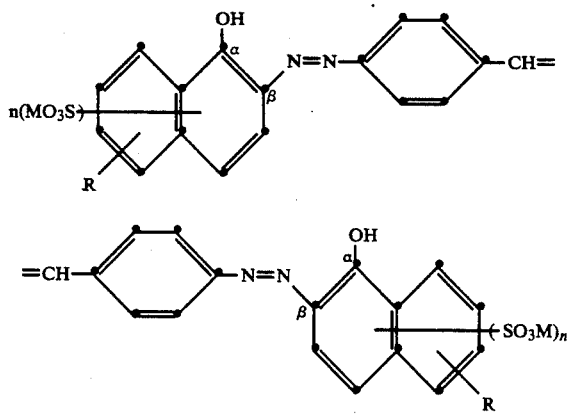

wherein R, M and n are as defined in claim 1, are preeminently suitable for dyeing paper in blue shades.

10 Claims, No Drawings

PROCESS FOR DYEING PAPER

This application is a continuation of application Ser. No. 382,134, filed Jul. 19, 1989, now abandoned.

Particular requirements are made at the present time of dyes which are used for dyeing paper. The dyes shall have, for example, a high degree of exhaustion under the special dyeing conditions, they shall produce dyeings of good wetfastness properties, and they shall be so readily soluble that it is possible to prepare liquid formulations. The blue paper dyes obtainable at the present time do not fulfil these conditions in all respects.

Blue dyes have now been found which are preeminently suitable for dyeing paper and which meet the requirements referred to above very well. In addition, the dyes give very good coloristic yields.

Accordingly, the present invention relates to a process for dyeing paper, which comprises the use of dyes of formula

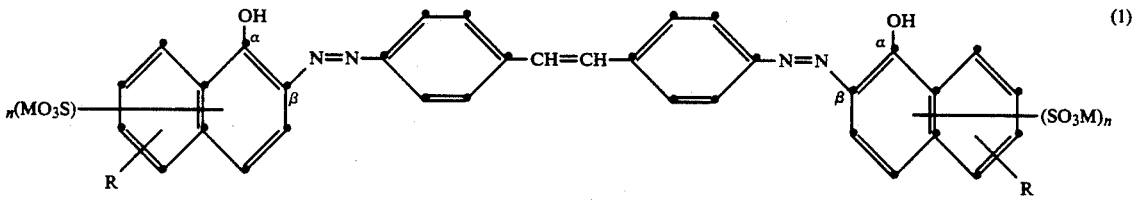

wherein
R is hydrogen, —OH, —OR$^1$, —NH$_2$, —NHR$^1$, —NHCOR$^1$, —NHSO$_2$R$^1$, —NHCONH$_2$ or —NHCONHR$^1$, in which R$^1$ is unsubstituted or substituted alkyl or aryl, M is hydrogen or the equivalent of a colourless cation, and n is 1 or 2,
and the —OH group in the α-position and the azo group in the β-position of the naphthalene nucleus are mutually interchangeable.

An alkyl radical R$^1$ may be an unsubstituted or substituted, unbranched or branched alkyl radical or a cycloalkyl radical. The cycloalkyl radical preferably contains 5 to 8 carbon atoms, and the open-chain alkyl radical contains 1 to 8 carbon atoms.

Unbranched or branched open-chain alkyl radicals may suitably be: methyl, ethyl, n-propyl and isopropyl, n-butyl, sec-butyl or tert-butyl, n-pentyl and isopentyl, n-hexyl and isohexyl or 2-ethylhexyl.

These alkyl radicals may carry one or more substituents, for example C$_1$–C$_4$alkoxy, hydroxy-substituted C$_1$–C$_4$alkoxy, or phenyl, phenoxy or phenylcarbamoyl, the phenyl moiety in each of said last three radicals may be substituted, for example by C$_1$–C$_4$alkyl, C$_1$–C$_4$alkoxy or phenoxy. Examples of suitable radicals of this type are: hydroxyethyl, 1-hydroxyisopropyl, ethoxymethyl, 2-hydroxyethoxypentyl, benzyl, 1-phenylethyl, 2-phenylethyl, 1-methyl-2-phenylethyl, 1-isobutyl-3-phenylpropyl, 1,5-diphenylpent-3-yl, 1-methyl-2-phenoxyethyl or 1-methyl-2-phenylcarbamoylethyl.

An unsubstituted or substituted C$_5$–C$_8$cycloalkyl radical R is preferably the cyclopentyl or cyclohexyl radical. Possible substituents are preferably C$_1$–C$_4$alkyl, most preferably methyl.

An aryl radical R is preferably a naphthyl and, most preferably, a phenyl radical, which radicals may be substituted, for example by sulfo, carboxy, C$_1$–C$_4$alkyl, C$_1$–C$_4$alkoxy, halogen such as fluoro, chloro or bromo, nitro, C$_1$–C$_4$alkylcarbonylamino or C$_1$–C$_4$alkoxycarbonyl.

The preferred meaning of R$^1$ is unsubstituted C$_1$–C$_4$alkyl or phenyl.

M is hydrogen or the equivalent of a colourless cation, for example lithium, sodium, potassium, ammonium or the protonated form of a C$_4$–C$_{12}$trialkylamine, C$_4$–C$_{12}$diamine or C$_2$–C$_{12}$alkanolamine.

M as a protonated C$_4$–C$_{12}$trialkylamine may be, for example, protonated N-ethyldimethylamine, N,N-diethylmethylamine, tri-n-propylamine, tri-n-butylamine, triisobutylamine and, in particular, triethylamine or triisopropylamine. Mixtures of different protonated amines are also suitable.

M as a protonated C$_4$–C$_{12}$diamine is, for example, an ethylenediamine or 1,3-diaminopropane in which one or both N-atoms are additionally substituted by one or two C$_1$–C$_4$alkyl radicals, preferably by methyl or ethyl groups. M is in this case preferably a N,N-dialkylethylenediamine or N,N-dialkyl-1,3-diaminopropane, for example N-ethylethylenediamine, N,N-dimethylethylenediamine, N,N'-dimethylethylenediamine, N,N-diethylethylenediamine, 3-dimethylamino-1-propylamine or 3-diethylamino-1-propylamine.

M as a protonated C$_2$–C$_{12}$alkanolamine may be, for example, the protonated form of a monoalkanolamine, dialkanolamine, monoalkanolmonoalkylamine, monoalkanoldialkylamine, dialkanolalkylamine or trialkanolamine, or a mixture of different protonated alkanolamines. Examples are protonated 2-aminoethanol, bis(2-hydroxyethyl)amine, N-(2-hydroxyethyl)dimethylamine, N-(2-hydroxyethyl)diethylamine, N,N-bis(2-hydroxyethyl)methylamine, N,N-bis(2-hydroxyethyl)ethylamine or tris(2-hydroxyethyl)amine, 2-(2-aminoethoxy)ethanol or diethylaminopropylamine.

The preferred meaning of M is Na$^\oplus$, Li$^\oplus$ or protonated C$_4$–C$_6$alkanolamine, and the preferred C$_4$–C$_6$alkanolamines are tris(2-hydroxyethyl)amine, bis(2-hydroxyethyl)amine or a mixture of these two amines.

A preferred embodiment of the dyeing process of this invention comprises the use of dyes of formula (1), wherein R is hydrogen, OH or NH$_2$.

It is also preferred to use those dyes of formula (1), wherein the OH groups are in the α-position and the azo groups are in the β-position of the naphthalene nuclei.

The particularly preferred process for dyeing paper comprises the use of dyes of formula

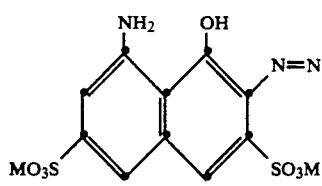 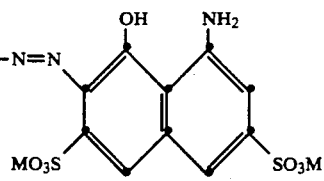 (2)

wherein M is Na⊕, Li⊕ or protonated C₄-C₆alkanolamine.

The dyes used in the processes of this invention are known or can be prepared in a manner which is known per se, for example by tetrazotising 4,4′-diaminostilbene and coupling the diazo intermediate to a naphtholsulfonic acid.

The dyes of formula (1) and (2) can be used in solid or liquid form for dyeing paper.

In powder or granular form the dyes are used in particular for discontinuous pulp dyeing, in which the dye is added batchwise to the pulper, hollander or mixing chest. In this process, the dyes are preferably used as dye formulations which may contain extenders, for example urea as solubiliser, dextrin, Glauber's salt, sodium chloride as well as dispersants, dust inhibitors and chelating agents such as tetrasodium pyrophosphate.

The invention thus also relates to solid dye formulations for dyeing paper, which formulations contain dyes of formula (1) or (2).

In recent years, the use of concentrated aqueous solutions of dyes has gained importance on account of the advantages which such solutions have over dyes in powder form. The use of solutions avoids the problems associated with dust formation and frees the end-user from the time-consuming and often difficult operation of dissolving the dye powder in water. The use of concentrated solutions has also been promoted by the development of continuous processes for dyeing paper, as in such processes it is expedient to add the solution direct to the hollander or at any other suitable juncture in paper manufacture.

Accordingly, the present invention also relates to concentrated aqueous solutions of dyes of formula (1) or (2), which solutions contain not less than 10 percent by weight, for example 10 to 30 percent by weight, of dye, based on the total weight of the solution. The solutions preferably contain 20 to 30 percent by weight of dye.

Concentrated aqueous solutions of dyes of formula (1) can be prepared, for example, by filtering the suspension obtained in the synthesis of the dye, effecting deionisation, if appropriate, for example by a membrane separating process, and stabilising the dye by the addition of an assistant, for example urea, ε-caprolactam or polyethylene glycol. It is also possible, however, to suspend the isolated dye in hydrochloric acid, to filter the suspension once more, and to mix the filter cake with lithium hydroxide or a suitable amine, for example an alkanolamine, and the requisite amount of water. Finally, it is also possible to carry out the coupling in the presence of LiOH, ammonia or alkanolamine, and to deionise the synthesis solution. Such dye solutions are suitable for dyeing a paper pulp in the presence of rosin and alum size.

The dye solutions so obtained preferably contain, per 100 parts of dye in the form of the free acid, 400 to 900 parts of water, 0 to 200 parts of further assistants such as urea, ε-caprolactam or polyethylene glycol as well as sufficient of a base that the pH is in the range from 7 to 10. Suitable bases are NaOH, LiOH, ammonia or organic amines, for example alkanolamines.

The aqueous concentrates of this invention, which are stable at storage temperatures of up to −5° C., are suitable for dyeing paper on which they give, with or without the use of a size, attractive blue shades.

Some of the dyes of formula (1) are known, but their utility for dyeing paper has not been contemplated. Compared with the known blue paper dyes, the eligible dyes of formula (1) are distinguished by the feature that the dyeings produced by them on paper have improved coloristic yields.

In the following Examples, parts and percentages are by weight.

EXAMPLE 1

A solution of the coupling component is prepared by dissolving 70.2 parts of the sodium salt of 1-amino-8-naphthol-3,6-disulfonic acid at pH 7 to 8 in 250 parts of water. Then 21.8 parts of 4,4′-diaminostilbene in 250 parts of water are diazotised by addition of 52 parts by volume of 4N sodium nitrite solution and 55 parts of 32% hydrochloric acid at a temperature in the range from 0° to 5° C. The diazo solution is then added dropwise over 1 hour to the above solution of the coupling component, while keeping the pH between 8 and 9 by addition of 4N aqueous sodium hydroxide solution and the temperature in the range from 5° to 10° C. The dye of formula

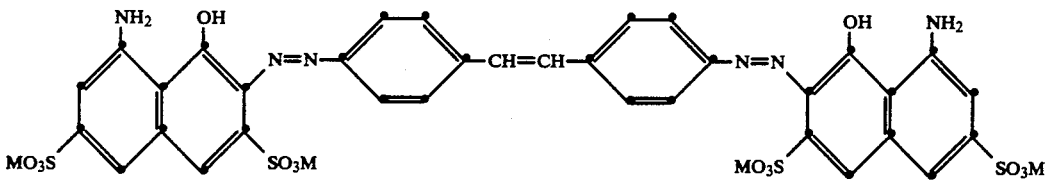

is isolated as sodium salt by salting out with sodium chloride. It dyes paper in brilliant blue shades. The tinctorial properties such as lightfastness, fastness to bleeding and affinity for paper, are excellent. The filter cake can be processed direct to liquid formulations.

EXAMPLE 2

200 parts of the dye of Example 1 in the form of the free dye acid of low salt content are homogenised by stirring in 500 parts of water and dissolved at 40° C. by addition of 75 parts of diethanolamine and 100 parts of urea. The solution is clarified by addition of a filter aid. The filtrate is cooled to room temperature and diluted to 1000 parts with water, to give a stable dye solution which constitutes a liquid formulation.

Instead of using diethanolamine, it is also possible to use monoethanolamine, triethanolamine, 2-(2-aminoethoxy)ethanol, the polyglycol amines disclosed in German Offenlegungsschrift 2 061 760, ammonia, tetramethylammonium hydroxide, lithium hydroxide or lithium carbonate.

EXAMPLE 3

A liquid formulation of the dye of Example 1 as lithium salt is prepared as follows: 70.2 parts of 1-amino-8-naphthol-3,6-disulfonic acid are dissolved in 400 parts of water by adding sufficient LiOH to adjust the pH to 7-8. The tetrazo component described in Example 1 is then added dropwise to this solution at 5°-10° C. over 1 hour, while keeping the pH between 8 and 9 by addition of 3N lithium hydroxide solution. The resultant dye solution is deionised by means of a conventional membrane and then concentrated to a weight of 600 g.

A stable dye solution is obtained. If desired, the rheological properties of this solution can be changed by adding an amide, for example urea or ε-caprolactam, in amount of ca. 30 to 120 g.

EXAMPLES 4-13

Liquid formulations of further dyes can be obtained in the manner described in Examples 1 to 3 by replacing the coupling component used in Example 1 by those listed in column 2 of the following Table. The dyes colour paper in the shade indicated in the last column of the Table.

| Example | Coupling component | Shade on paper |
|---------|-------------------|----------------|
| 4 | 1-amino-8-hydroxynaphthalene-2,4-disulfonic acid | blue |
| 5 | 1-amino-8-hydroxynaphthalene-4,6-disulfonic acid | blue |
| 6 | 1,8-dihydroxynaphthalene-3,6-disulfonic acid | blue |
| 7 | 1-dihydroxynaphthalene-3,6-disulfonic acid | reddish blue |
| 8 | 1-dihydroxynaphthalene-3,8-disulfonic acid | reddish blue |
| 9 | 2-dihydroxynaphthalene-3,6-disulfonic acid | violet |
| 10 | 2-dihydroxynaphthalene-5,7-disulfonic acid | violet |
| 11 | 2-dihydroxynaphthalene-6,8-disulfonic acid | violet |
| 12 | 2-(3'-sulfophenylamino)-5-naphthol-7-sulfonic acid | reddish blue |
| 13 | 2-anilino-5-naphthol-7-sulfonic acid | reddish blue |

EXAMPLE 14

70 parts of chemically bleached softwood sulfite pulp and 30 parts of chemically bleached birchwood sulfite pulp are beaten in 2000 parts of water in a hollander. To this pulp are added 2.5 parts of the dye solution described in Example 2. After mixing for 20 minutes, paper is prepared from this pulp. The absorbent paper so obtained is dyed blue. The wastewater is almost colourless.

EXAMPLE 15

0.5 part of the dye powder of Example 1 is dissolved in 100 parts of hot water and the solution is cooled to room temperature. This solution is added to 100 parts of chemically bleached sulfite pulp which has been beaten in 2000 parts of water in a hollander. After mixing thoroughly for 15 minutes, sizing is effected in conventional manner with rosin size and aluminium sulfate. Paper prepared from this pulp is dyed in a blue shade of good wetfastness properties.

EXAMPLE 16

96 g of the sodium salt of the dye obtained according to Example 1 are stirred in 600 ml of water and then 160 ml of nitrobenzene, 81.4 g of tributylamine and 44 ml of 32% HCl are added at 50° C. The mixture is stirred at 70° C. until the dye has transferred completely to the organic phase. The aqueous phase is discarded and the organic phase is washed with two 600 ml portions of hot water. Then 300 ml of water and 80.0 g of triethanolamine are added and the mixture is stirred at 85° C. until the dye has transferred completely to the aqueous phase. The aqueous phase is freed from traces of nitrobenzene and tributylamine by steam distillation. A stable dye solution is obtained. The organic phase is used direct for further extractions.

What is claimed is:

1. A process for dyeing paper, which comprises contacting paper with a solid or liquid aqueous dye, wherein said liquid dye is substantially undissolved in the dyeing liquor, said dye being of the formula

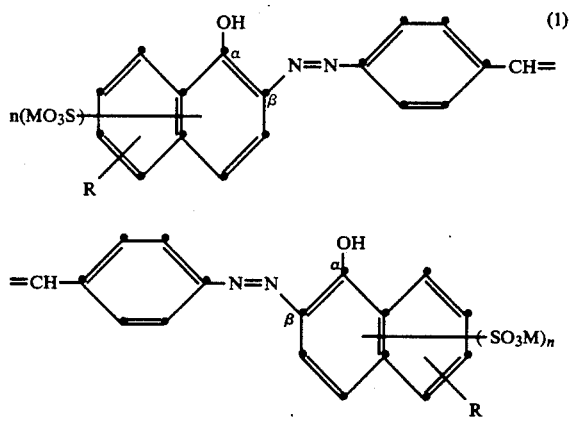

wherein
R is hydrogen, —OH, —OR$^1$, —NH$_2$, —NHR$^1$, —NHCOR$^1$, —NHSO$_2$R$^1$, —NHCONH$_2$ or —NHCONHR$^1$, in which R$^1$ is unsubstituted or substituted alkyl or aryl, M is hydrogen or the equivalent of a colourless cation, and n is 1 or 2, and the —OH group in the α-position and the azo group in the β-position of the naphthalene nucleus are mutually interchangeable.

2. A process according to claim 1, which comprises the use of a dye of formula (1), wherein R is hydrogen, OH or NH$_2$.

3. A process according to claim 1 which comprises the use of a dye of formula (1), wherein the OH groups are in the α-position and the azo groups are in the β-position of the naphthalene nuclei.

4. A process according to claim 1, which comprises contacting with paper a dye of formula

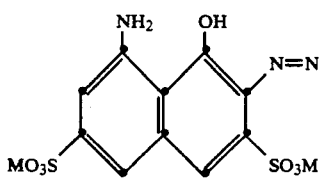 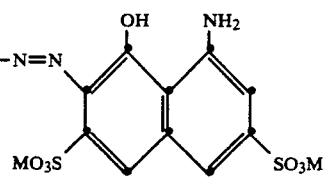

(2)

wherein M is Na⊕, Li⊕ or protonated $C_2$-$C_6$alkanolamine.

5. A concentrated aqueous solution of a dye of according to claim 1, which solution contains 10 to 30 percent by weight of dye, based on the total weight of the solution.

6. A concentrated aqueous solution according to claim 5, which contains 20 to 30 percent by weight of dye.

7. A concentrated aqueous solution according to claim 5, wherein the dye is in the form of a lithium or alkanolamine salt.

8. Paper dyed by a process as claimed in claim 1.

9. A concentrated aqueous solution according to claim 7, wherein the dye is in the form of a diethanolamine or triethanolamine salt.

10. The method of using an aqueous dye solution as claimed in claim 5 for dyeing paper.

* * * * *